US012755038B2

(12) United States Patent
Hill et al.

(10) Patent No.: US 12,755,038 B2
(45) Date of Patent: Oct. 6, 2026

(54) HYBRID ACCESS CONTROL RESOURCE MANAGEMENT

(71) Applicant: Microsoft Technology Licensing, LLC, Redmond, WA (US)

(72) Inventors: David Alan Hill, Seattle, WA (US); Jennifer Marie Boertlein, McLean, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 18/474,157

(22) Filed: Sep. 25, 2023

(65) Prior Publication Data

US 2025/0103734 A1 Mar. 27, 2025

(51) Int. Cl.
*G06F 21/62* (2013.01)
*G06F 21/31* (2013.01)

(52) U.S. Cl.
CPC .......... *G06F 21/6209* (2013.01); *G06F 21/31* (2013.01)

(58) Field of Classification Search
CPC .............................. G06F 21/6209; G06F 21/31
See application file for complete search history.

(56) References Cited

U.S. PATENT DOCUMENTS

2011/0119597 A1* 5/2011 Yellamraju ......... H04L 65/4038 715/753
2012/0060207 A1* 3/2012 Mardikar ................ H04L 63/20 726/4
2015/0058228 A1* 2/2015 Voeller ................. G06Q 10/103 705/301
2018/0239959 A1* 8/2018 Bui .......................... G06F 16/93
2019/0362087 A1* 11/2019 Ferrans ................. H04L 63/102
2024/0112766 A1* 4/2024 True ........................ G16H 10/20
2024/0179181 A1* 5/2024 Torlak ................... H04L 63/104
2024/0179182 A1* 5/2024 Hicks ...................... H04L 63/20
2024/0179188 A1* 5/2024 Torlak ................... H04L 63/205
2024/0283784 A1* 8/2024 McCormick ........ G06F 21/6218

OTHER PUBLICATIONS

Aftab Mu, Hamza A, Oluwasanmi A, Nie X, Sarfraz MS, Shehzad D, Qin Z, Rafiq A. Traditional and hybrid access control models: A detailed survey. Security and Communication Networks. 2022;2022(1):1560885. (Year: 2022).*
Long S, Yan L. Racac: An approach toward RBAC and ABAC combining access control. In2019 IEEE 5th International Conference on Computer and Communications (ICCC) Dec. 6, 2019 (pp. 1609-1616). IEEE. (Year: 2019).*

* cited by examiner

*Primary Examiner* — James R Turchen
(74) *Attorney, Agent, or Firm* — Alleman Hall LLP

(57) ABSTRACT

Hybrid access control management systems for managing role-based access control resources and attribute-based access control resources are provided. One aspect provides a computing system for implementing hybrid access control management, the computing system comprising: processing circuitry coupled to memory that stores instructions, which, upon execution by the processing circuitry, cause the processing circuitry to: receive a request from a user account to access an access-controlled resource; determine a protection mechanism of the access-controlled resource, wherein the protection mechanism is an attribute-based protection mechanism or a role-based protection mechanism; validate the request from the user account based on the determination of the protection mechanism; and permit the user account to access the access-controlled resource upon successful validation of the request.

16 Claims, 6 Drawing Sheets

HYBRID ACCESS CONTROL RESOURCE MANAGEMENT

BACKGROUND

In security administration, access control can be implemented to restrict system access to authorized users. Various types of access control schemes have been contemplated. Role-based access control (RBAC) is an access control mechanism defined around roles. Instead of individual discretionary-based permission grants, access to resources (e.g., data objects and services) is granted based on the user's membership in particular roles. With RBAC, access security can be managed for groups of employees/users, which can help simplify security administration for large organizations. For example, within an organization, roles can be created for various job functions. Instead of individually assigning permissions, management of user access to resources for performing the job functions related to a specific role can be implemented by assigning said role to the user(s). Changes in access rights can be made for a given role, which in turn affects all users with the given role and future users assigned with the given role.

Another access control scheme includes attribute-based access control (ABAC). In ABAC, system access is determined by evaluating attributes associated with various related entities. For example, attributes can be associated to the user, the resource being accessed, the requested operation(s) on the resource, the environment, etc. Attributes can be highly adaptable and customized, making ABAC suitable for use in distributed or rapidly changing environments. For example, attribute values can be atomic-valued or set-valued, where a set-valued attribute contains more than one atomic value. Unlike RBAC, ABAC can express complex rule sets that can evaluate many different attributes. Generally, ABAC policies are typically implemented with computational language and Boolean logic to evaluate the relevant attributes.

SUMMARY

Hybrid access control management systems for managing role-based access control resources and attribute-based access control resources are provided. One aspect provides a computing system for implementing hybrid access control management, the computing system comprising: processing circuitry coupled to memory that stores instructions, which, upon execution by the processing circuitry, cause the processing circuitry to: receive a request from a user account to access an access-controlled resource; determine a protection mechanism of the access-controlled resource, wherein the protection mechanism is an attribute-based protection mechanism or a role-based protection mechanism; validate the request from the user account based on the determination of the protection mechanism; and permit the user account to access the access-controlled resource upon successful validation of the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
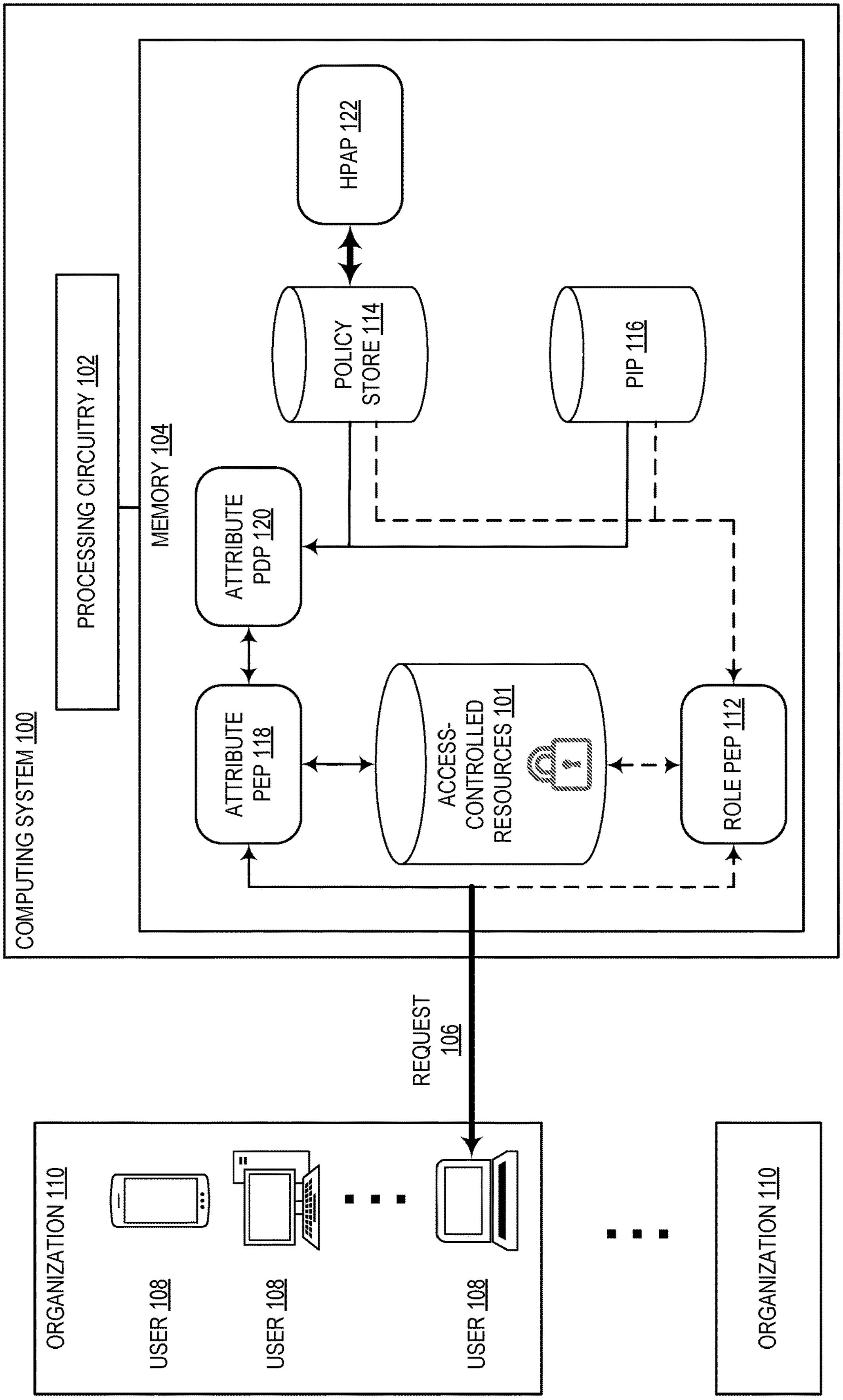
FIG. 1 shows a schematic view of an example computing system for implementing hybrid access control management.

Organizations can struggle with the complexity of managing access control policies. The challenge is especially prevalent in larger, more elaborate systems, such as those found in highly regulated institutions (e.g., financial institutions, governments, oil and gas companies, etc.). In addition to the complexity of managing such systems, another challenge involves the migration of an access control methodology to a different one. For example, an organization might desire to migrate their resource management solution from a role-based access control methodology to an attribute-based access control methodology, which can provide for more granular control over access permissions. Depending on the complexity, performing a complete conversion from one access control methodology to another methodology introduces several issues. A complete conversion can result in prolonged downtime, disrupting user access to needed resources. Another issue includes unintended and unanticipated changes in access permissions due to the change in the methodology that enforces the access control policies. For example, "roles" that are granted access to a given resource in a role-based methodology might not have a direct translation to "attributes" defined in an attribute-based methodology. Redefining these roles into attributes for users that maintain their access permissions to the protected resources can be difficult and can lead to unexpected results.

In view of the observations above, hybrid access control resource management solutions are provided and described herein. Hybrid access control solutions provide a streamlined approach to managing access control policies for systems implementing two or more access control schemes. In some implementations, a hybrid access control solution is implemented to provide simultaneous management for both role-based and attribute-based protected resources. One application includes situations where an organization may desire to expand its role-based access control system to grant access privileges based on attributes (e.g., time of day, location, etc.). In such cases, the organization may incorporate attribute-based elements to their existing RBAC system using a uniform system that provides simultaneous management of both attribute-based and role-based access control policies. With a uniform system capable of managing both methodologies, the incorporation of attribute-based elements can be performed without completely reconfiguring the existing access control system. Additionally, a hybrid approach allows organizations to gradually transition from an RBAC system to a fully ABAC system, if desired, without disrupting the existing system. For example, role-based protected resources can be gradually converted to attribute-based protected resources without disruption as the system can manage both methodologies. Unintended changes in access permissions can be quickly discerned and fixed as the conversion occurs gradually.

Incorporating attribute-based elements to an existing RBAC framework using a hybrid approach provides several advantages. Using a hybrid system that provides simultaneous management of the two methodologies reduces the complexity involved. With a single uniform methodology, organizations can streamline their access control management processes. Instead of maintaining separate methodologies, components, and processes for role-based and attribute-based access control, administrators can focus on a unified system that encompasses both methodologies. This simplifies policy creation, updates, and enforcement, reducing the administrative overhead and minimizing the chances of policy inconsistencies or conflicts.

Expansion of an RBAC system to include attribute-based elements allows for more dynamic access control over protected resources. By leveraging a hybrid approach, complex access policies can be defined and enforced by combining RBAC and ABAC methodologies, allowing for organizations to adapt and respond to evolving security requirements more effectively. By combining role-based and attribute-based access control, organizations can achieve enhanced security and fine-grained control over access permissions. Role-based access control provides a high-level structure for managing access rights, while attribute-based access control allows for multiple attributes and conditions to be considered. This combination enables organizations to define access policies that consider both roles and attributes, resulting in more precise and context-aware access decisions. For example, more complex access policies can be enforced to provide access security based on a combination of factors, such as user attributes, environmental conditions, data classifications, organizational policies, etc.

Managing a single uniform methodology for simultaneous role-based and attribute-based access control provides future-proofing and flexibility. Such implementations allow for an organization to transition smoothly from role-based methodologies to attribute-based methodologies or to adopt a hybrid approach as needed. This flexibility ensures that the access control implementation can evolve with changing security requirements, regulatory demands, and business needs. Organizations can introduce attribute-based elements gradually without disrupting existing systems, making it easier to adapt to emerging technologies, evolving user roles, and complex access scenarios. A hybrid methodology for simultaneous role-based and attribute-based access control also facilitates integration of external systems. Oftentimes, an organization may need to integrate an external system, such as cloud services or partner applications, into their access control framework. A hybrid approach can provide for a consistent access and security policy across both internal and external systems, regardless of the access control methodologies used in those systems. This simplifies the management of access policies and provides a cohesive security approach.

Briefly, hybrid access control management can be implemented in a system storing both RBAC and ABAC resources by providing mechanisms capable of determining whether a user account can access a given resource irrespective of whether the resource is RBAC- or ABAC-protected. In response to an access request from a user account to access an access-controlled resource, the hybrid access control management system determines whether the requested resource is RBAC- or ABAC-protected and applies the appropriate logic to validate the access request. The validation process can be implemented using a uniform access control methodology capable of handling requests for both RBAC and ABAC resources. Upon validation, the management system permits security access for the user account for the requested resource.

Hybrid access control management systems can be implemented using various hardware and system configurations. FIG. 1 shows an example computing system 100 for implementing hybrid access control management. The example computing system 100 can be implemented as a server system providing a storage solution where security access is managed and enforced by a hybrid access control methodology. For example, the computing system 100 can be provided as a cloud-storage solution or a local storage server providing security access to access-controlled resources 101. As such, the various components and modules described herein can be distributed and implemented across multiple devices within the computing system 100.

The example computing system 100 includes processing circuitry 102 and memory 104. Processing circuitry 102, which can be implemented as a set of processors, is configured to execute instructions stored in memory 104 for performing the various processes described herein. Upon receiving a request 106 to access an access-controlled, or protected, resource 101 from a user 108, such as a user account, of an organization 110, the example computing system 100 determines whether the requested resource 101 is RBAC-protected or ABAC-protected. In the depicted example, the computing system 100 provides access control and manages resources for multiple organizations 110, each of which includes multiple users 108. The access request 106 describes an intended operation to be performed on the access-controlled resource 101. An access-controlled resource can include any resource managed by the hybrid access control management system, such as a data object, a group or location of data objects, a service, etc. Upon determination of the protection mechanism of the requested resource 101, the request 106 is intercepted by the appropriate enforcement entity.

If the requested resource is RBAC-protected, a role policy enforcement point (PEP) module 112 intercepts the access request 106 and determines whether to permit or to deny access to the user 108. The validation process for requests to RBAC-protected resources can be performed in various ways. In the depicted example, the role PEP module 112 queries a policy store database 114 to evaluate the access control policy associated with the requested resource. To validate the request 106, the role PEP module 112 also queries a policy information point (PIP) database 116 to determine whether the user 108 is associated with a role that is permitted access to the requested resource 101. Upon validation, the role PEP module 112 permits the user 108 to access the requested resource 101.

If the requested resource is ABAC-protected, an attribute PEP module 118 intercepts the access request 106. The validation process for requests to ABAC-protected resources can be performed in various ways. In the depicted example, the attribute PEP module 118 transmit the access request 106 to an attribute policy decision point (PDP) module 120 that evaluates the access request 106 against authorization rules to determine an access decision of whether to permit or to deny access to the user 108. In other implementations, the responsibilities of the attribute PEP module 118 and the attribute PDP module 120 are handled by the same component/module.

The attribute PDP module 120 validates the access request 106 by querying and evaluating the access control policy associated with requested resource from the policy store database 114. The policy store database 114 stores the access control polices for both RBAC and ABAC policies and is managed by a hybrid policy administration point (HPAP) module 122, which manages the data rules that uniformly provide authorization governance to both attribute-based and role-based protected resources. The attribute-based access policy is evaluated against attributes retrieved from the PIP database 116. The retrieved attributes can be associated with various entities. For example, an attribute can be related to the user 108 (e.g., job title, department, location, etc.), the requested resource (e.g., whether the resource is a file, a database row, a service, etc.), the environment (e.g., current time/date), or the intended operation (e.g., delete, update, etc.). Once the attributes are evaluated against the attribute-based access policy, the attribute PDP module 120 issues an access decision to the attribute PEP module 118 describing whether to permit or to deny access to the access-controlled resource. The attribute PEP module 118 enforces the access decision, either denying or permitting the user 108 access to the access-controlled resource from the database of managed resources 101.

FIG. 1 illustrates an example implementation of a hybrid access control management system, which is configured to simultaneously manage role-based protected resources and attribute-based protected resources using a uniform access control policy. The hybrid access control methodology implemented as such incorporates elements from both role-based and attribute-based methodologies, described in further detail below with respect to FIGS. 2 and 3.

Figure 2:
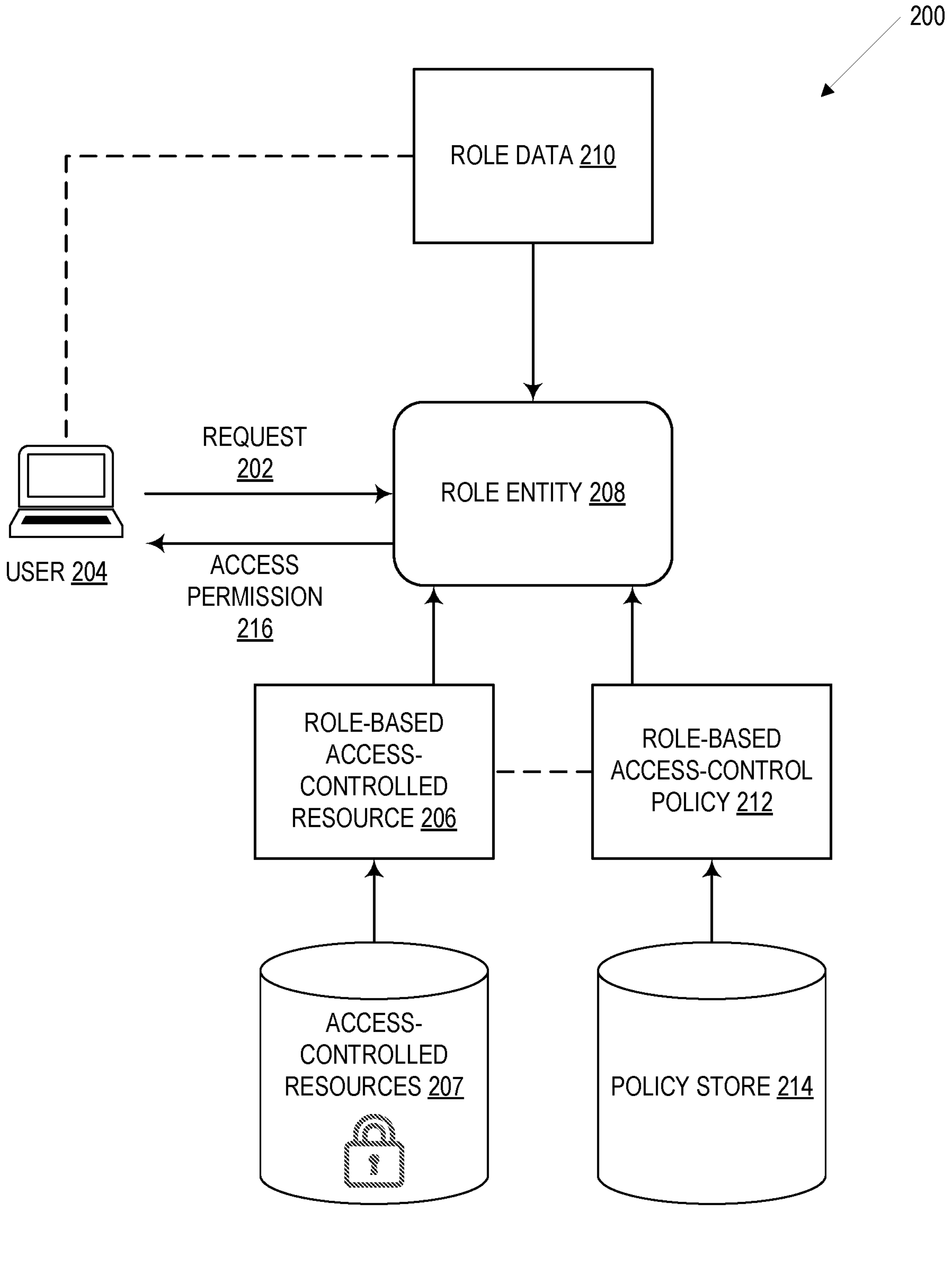
FIG. 2 shows a model of an example role-based access control methodology.

FIG. 2 shows a model 200 of an example role-based access control methodology. The RBAC process starts with a request 202 from a user 204, such as a user account, to access a role-based access-controlled resource 206 from a database of role-based access-controlled resources 207. A role entity 208 receives the request 202 and enforces whether the user 204 can access the role-based access-controlled resource 206. The role entity 208 determines the role(s) 210 assigned to the user 204 and validates them against a role-based access control policy 212 retrieved from a policy store 214 that governs the role-based access-controlled resource 206. Upon validation that the role(s) 210 of the user 204 are permitted to access the role-based access-controlled resource 206, the role entity 208 grants access permissions 216 accordingly. The role entity 208 can be implemented in various ways, including as a role PEP module such as the one described in FIG. 1.

Roles are predefined and can provide a high-level structure for managing access rights. For example, roles can describe a job title, a seniority level, a department, a geographic location, etc. Roles can be assigned to users and their associated user accounts in various ways. For example, roles can be assigned automatically and/or manually. In some implementations, roles are automatically assigned to users whose data meet certain criteria for a given role. For example, upon creation of a user account, data of the user can be stored in a policy information point database (such as PIP database 116 of FIG. 1). Users with PIP data that meets certain criteria for a given role can be automatically assigned to that role. User data can be updated, and roles can be updated accordingly. A user 204 can have multiple roles, and the access control policy 212 can define multiple roles that are permitted access to the associated resource. The access control policy 212 can also define whether only one role or multiple roles are needed by the same user to access the resource 206.

Figure 3:
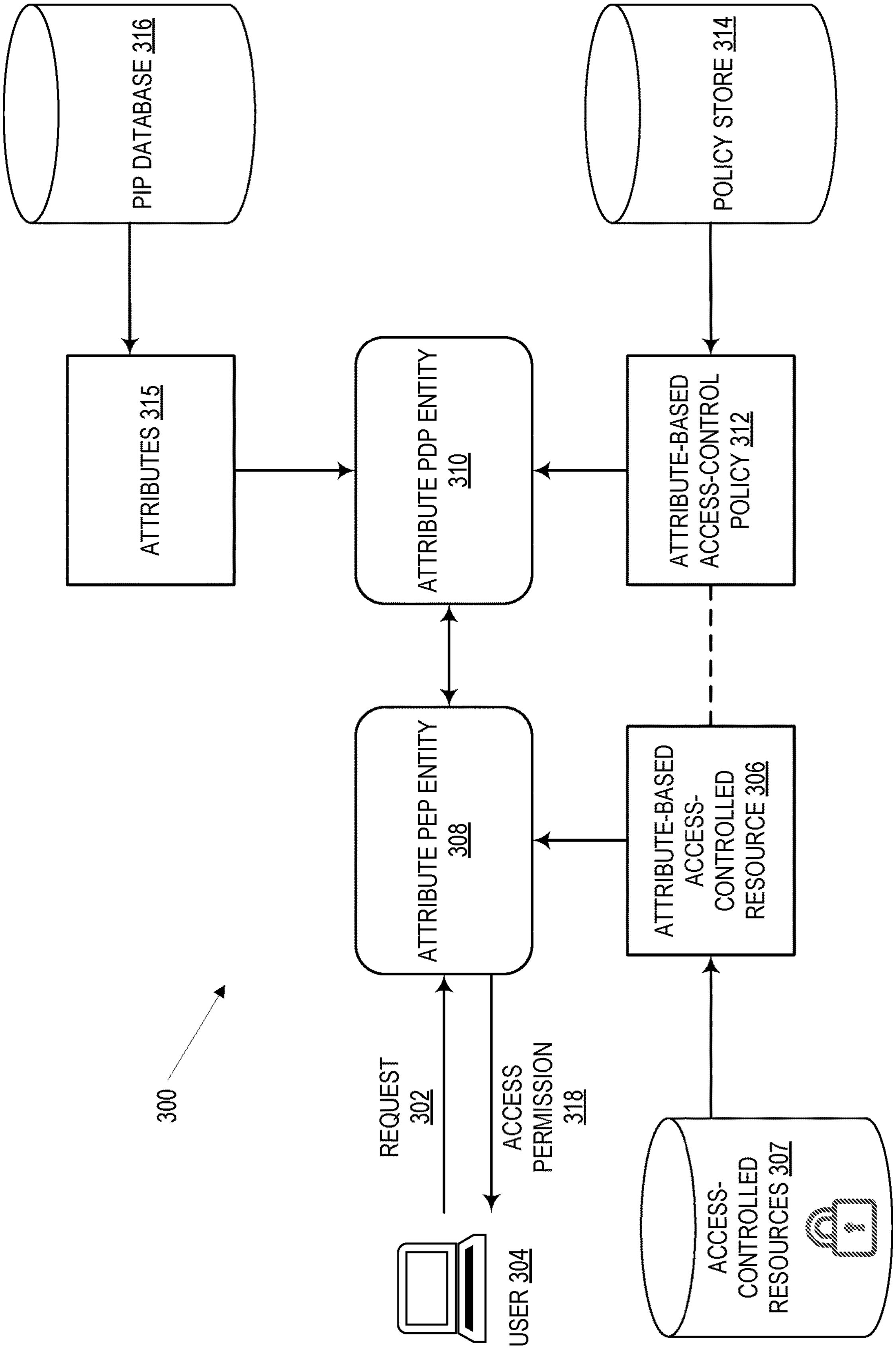
FIG. 3 shows a model of an example attribute-based access control methodology.

Although role-based access control methodologies provide a high-level structure within which access rights can be managed, they lack granularity and the ability to provide more complex control over access rights. In some applications, higher levels of control are desirable. In such cases, an attribute-based access control methodology can be implemented. FIG. 3 shows a model 300 of an example attribute-based access control methodology. The ABAC process starts with a request 302 from a user 304, such as a user account, to access an attribute-based access-controlled resource 306 from a database of attribute-based access-controlled resources 307. An attribute PEP entity 308 receives the request 302 and transmits it to an attribute PDP entity 310. The attribute PEP entity 308 and the attribute PDP entity 310 can be implemented in various ways, including as modules such as those described in FIG. 1.

The attribute PDP entity 310 validates the access request by evaluating an attribute-based access policy 312 associated with the attribute-based access-controlled resource 306. Access control policy 312 can be stored in and retrieved from a policy store 314. The attribute PDP entity 310 retrieves attributes 315 associated with the attribute-based access policy 312 and evaluates them against the attribute-based access policy 312 to determine an access decision. Attributes 315 may be stored in and retrieved from a PIP database 316. The access decision is provided to the attribute PEP entity 308, which then enforces whether the user 304 can access the resource 306 based on the access decision. If the access decision indicates that the user 304 is permitted to access the attribute-based access-controlled resource 306, the attribute PEP entity 308 grants access permission 318 accordingly.

In contrast to predefined roles, attributes provide more precise control over access decisions. An attribute can include values of various formats and can be related to entities other than the user. For example, an access control policy for an access-controlled resource can define that access to said resource is permitted before a certain date. When a request to access the resource is to be validated, the current date is queried as an attribute and evaluated against the access control policy. Upon validation that the access control policy is satisfied, access is granted accordingly.

Role-based and attribute-based access control methodologies provide different advantages depending on the application. Generally, role-based access control methodologies are simpler to implement and provide a high-level application of access security. Attribute-based access control methodologies allow for more control of access security, providing the capabilities of generating and enforcing complex policies. Systems managing both role-based and attribute-based protected resources can be implemented in many different ways. One straightforward, naïve implementation includes managing and enforcing two different access control systems. Alternatively, a hybrid approach can be taken where a uniform access control system capable of handling access requests to both role-based and attribute-based protected resources is implemented.

Figure 4:
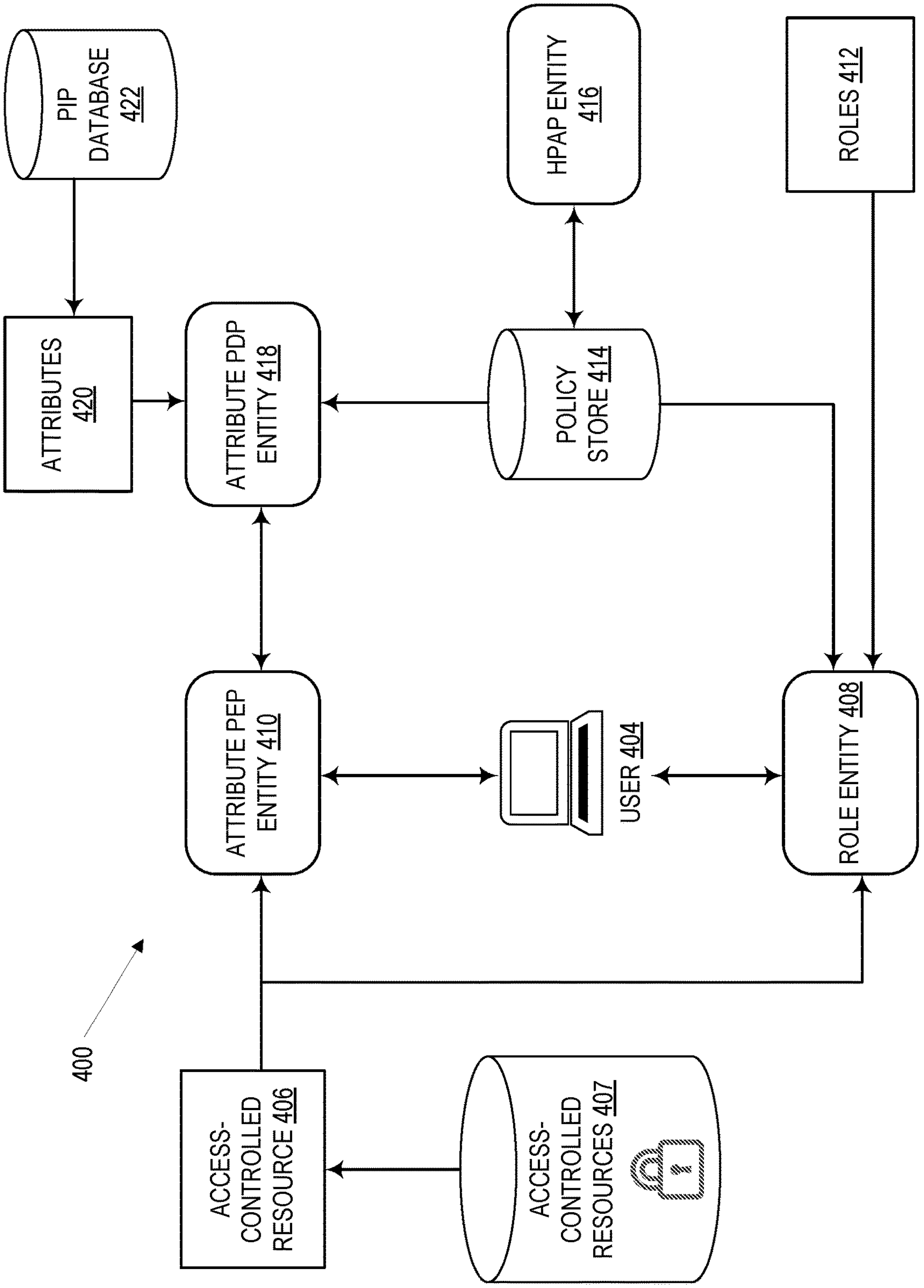
FIG. 4 shows a model of an example hybrid access control methodology for managing role-based protected resources and attribute-based protected resources, which can be implemented using the computing system of FIG. 1.

FIG. 4 shows a model 400 of an example hybrid access control methodology for managing role-based protected resources and attribute-based protected resources. In addition to incorporating elements from both role-based and attribute-based access control methodologies, the model 400 includes components that provide integration of both methodologies into a uniform access control system, allowing access security to be managed and enforced using a uniform policy from a management perspective. The process starts with a request from a user 404, such as a user account, to access an access-controlled resource 406 from a database 407 storing both role-based protected resources and attribute-based protected resources. If the access-controlled resource 406 is role-based protected, a role entity 408 receives and handles the request. If the access-controlled resource 406 is attribute-based protected, an attribute PEP entity 410 receives and handles the request.

If the access-controlled resource 406 is role-based protected, the role entity 408 handles the request by determining the role(s) 412 assigned to the user 404 and validating them against an access control policy associated with the access-controlled resource 406. Upon validation that the access control policy is satisfied, the role entity 408 can permit the user 404 to access the access-controlled resource 406. The access control policy can be retrieved from a policy store database 414 that stores both role-based access control policies and attribute-based access control policies. In the depicted example, the policy store database 414 is managed by an HPAP entity 416. The HPAP entity 416 manages data rules that uniformly provide authorization governance to both role-based and attribute-based resources.

If the access-controlled resource 406 is attribute-based protected, an attribute PEP entity 410 receives and handles the request. The attribute PEP entity 410 transmits the request to an attribute PDP entity 418 responsible for evaluating the request against authorization rules. The attribute PDP entity 418 validates the access request by evaluating an access control policy associated with the access-controlled resource 406. In the depicted example, the access control policy is retrieved from the same policy store database 414 that stores the role-based access control policies. The attribute PDP entity 418 retrieves attributes 420 associated with the access control policy to be evaluated. Attributes 420 may be stored in and retrieved from a PIP database 422. The attribute PDP entity 418 then evaluates the retrieved attributes against the access control policy and determines an access decision. The access decision is sent to the attribute PEP entity 410 to be enforced, where the user 404 is denied or permitted access to the access-controlled resource 406 by the attribute PEP entity 410 based on the access decision. If access is permitted, access permission for the access-controlled resource 406 is granted to the user 404.

FIG. 4 depicts an example hybrid access control model, which can be implemented in various configurations. For example, with respect to FIG. 1, the different modules representing the different entities described in FIG. 4 can be implemented in a distributed manner across a plurality of computing devices. Furthermore, the various entities described in FIG. 4 governing the access control process can be logically reduced to fewer components. For example, the role entity 408 and the attribute PEP entity 410 can be implemented using as a single logical component that receives access requests and evaluates them accordingly depending on whether the requested resource is role-based or attribute-based protected.

Figure 5:
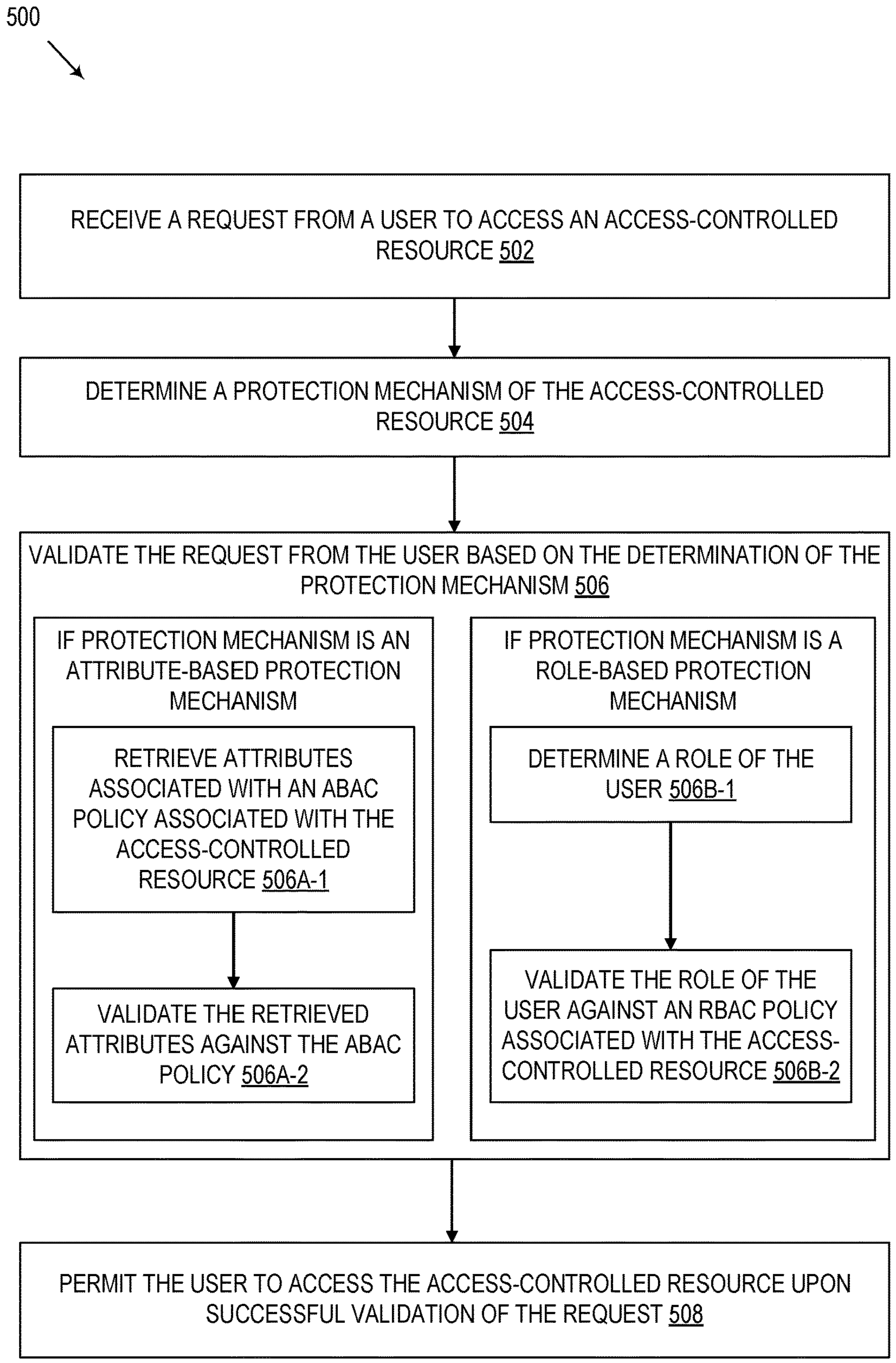
FIG. 5 shows a flow chart of an example method for implementing hybrid access control management, which can be implemented using the computing system of FIG. 1.

In addition to different hardware/software implementations of the hybrid access control methodology described herein, different steps and processes can also be implemented. FIG. 5 shows a flow chart of an example method 500 for implementing hybrid access control management. The method 500 includes, at step 502, receiving a request from a user to access an access-controlled resource. The user can be one of a plurality of user accounts associated with an organization for which the hybrid access control management system is implemented. In some implementations, the hybrid access control management system provides and manages security access for a plurality of organizations.

The access-controlled resource can be any resource managed by the hybrid access control management system. For example, the access-controlled resource can be a data object, a group of data objects, or a file location. In some implementations, the access-controlled resource is a service to be performed. The request can be an access request that describes the access-controlled resource and the intended operation to be performed on said access-controlled resource. For example, the access request can be a request to view the resource, to modify the resource, and/or to delete the resource. Different requests can result in different access control policies to be applied. In some implementations, the access request is received by a policy enforcement point module.

The method 500 includes, at step 504, determining a protection mechanism of the access-controlled resource, wherein the protection mechanism is an attribute-based protection mechanism or a role-based protection mechanism. The determination of the protection mechanism can be performed in various ways. In some implementations, the policy enforcement point module that receives the access request also determines the protection mechanism of the request.

The method 500 includes, at step 506, validating the request from the user based on the determination of the protection mechanism. Validating the request can be performed in various ways. In a hybrid access control management system, validation of the request can be performed using a uniform policy. For example, a hybrid access control management system can receive and process requests for both attribute-based protected resources and role-based protected resources. Depending on the protection mechanism, the hybrid access control management system can validate the request accordingly.

If the protection mechanism is an attribute-based protection mechanism, the method 500 includes, at step 506A-1, retrieving attributes associated with an attribute-based access control policy describing attribute values permitted to access the access-controlled resource. The attribute-based access control policy can be stored in and retrieved from a hybrid policy store database, which stores, in addition to attribute-based access control policies, role-based access control policies. The attributes can be stored in and retrieved from a policy information point database, which can serve as an attribute store.

The method 500 includes, at step 506A-2, validating the retrieved attributes against the attribute-based access control policy. Validating the retrieved attributes against the attribute-based access control policy can be implemented in various ways. In some implementations, the attribute-based access control policy describes criteria that includes a plurality of attribute values to be satisfied before access to the associated access-controlled resource is granted. The criteria can include satisfying a subset of the plurality of attribute values. Attributes can be implemented in various ways. In some implementations, the retrieved attributes include at least one of: an attribute associated with the user, an attribute associated with the access-controlled resource, an attribute associated with an environment, or an attribute associated with an intended operation of the request. Attribute values can be atomic-valued or set-valued, where a set-valued attribute contains more than one atomic value.

If the protection mechanism is a role-based protection mechanism, the method 500 includes, at step 506B-1, determining a role of the user. In some implementations, the user can have multiple roles. Roles can be assigned to a user in various ways, including automatically and/or manually. For example, upon creation of a user account for the hybrid access control management system, data of the user can be used to determine the roles, if any, to be assigned to the user. If the data of the user meets the conditions for a given role, the given role can be assigned to the user automatically. In one example, the data of the user can describe their job title. Based on the user's job title, the hybrid access control management system can assign roles to the user matching the data (e.g., roles describing levels of seniority). In some implementations, the data of the user is stored in a policy information point database, which can be the same database that stores attributes. As the data of the user is updated, the roles of the user can also be updated accordingly.

The method 500 includes, at step 506B-2, validating the role of the user against a role-based access control policy describing one or more roles permitted to access the access-controlled resource. Validating the role of the user against the role-based access control policy can be implemented in various ways. In some implementations, the role-based access control policy describes criteria that includes one or more roles permitted to access the access-controlled resource. The criteria can include satisfying a subset of the roles permitted to access the access-controlled resource. As described above, the role-based access control policy can be stored in and retrieved from a hybrid policy store database that also stores attribute-based access control policies.

A hybrid policy store database storing both role-based access control policies and attribute-based access control 1 policies provides a streamlined implementation for a hybrid access control management system. In some implementations, the hybrid policy store database is managed by a hybrid policy administration point module. For example, policies can be generated and stored in the hybrid policy store database by the hybrid policy administration point module. Similarly, policies stored in the hybrid policy store database can be modified and/or deleted by the hybrid policy administration point module.

The method 500 includes, at step 508, permitting the user to access the access-controlled resource upon successful validation of the request. Upon successful validation, an access decision granting access to the access-controlled resource can be provided to the entity responsible for enforcing access security for the resources. As described above, access to the access-controlled resource can include various operations, such as viewing, modifying, deleting, etc., that can be performed on the access-controlled resource. In some implementations, access to the access-controlled resource is enforced a policy enforcement point module that also receives the request. In other implementations, separate modules are implemented to manage access to the access-controlled resource.

Hybrid access control management systems and related implementations provide a framework that allows for the simultaneous management of the two or more access control methodologies. Under a uniform access control methodology, organizations can streamline their access control management processes. For example, various embodiments described above provide for implementations that incorporate attribute-based elements to an existing RBAC framework. This provides simultaneous management of both attribute-based and role-based access control policies. Additionally, such a framework allows organizations to gradually transition from an RBAC system to an ABAC system, if desired, without disrupting the existing system.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
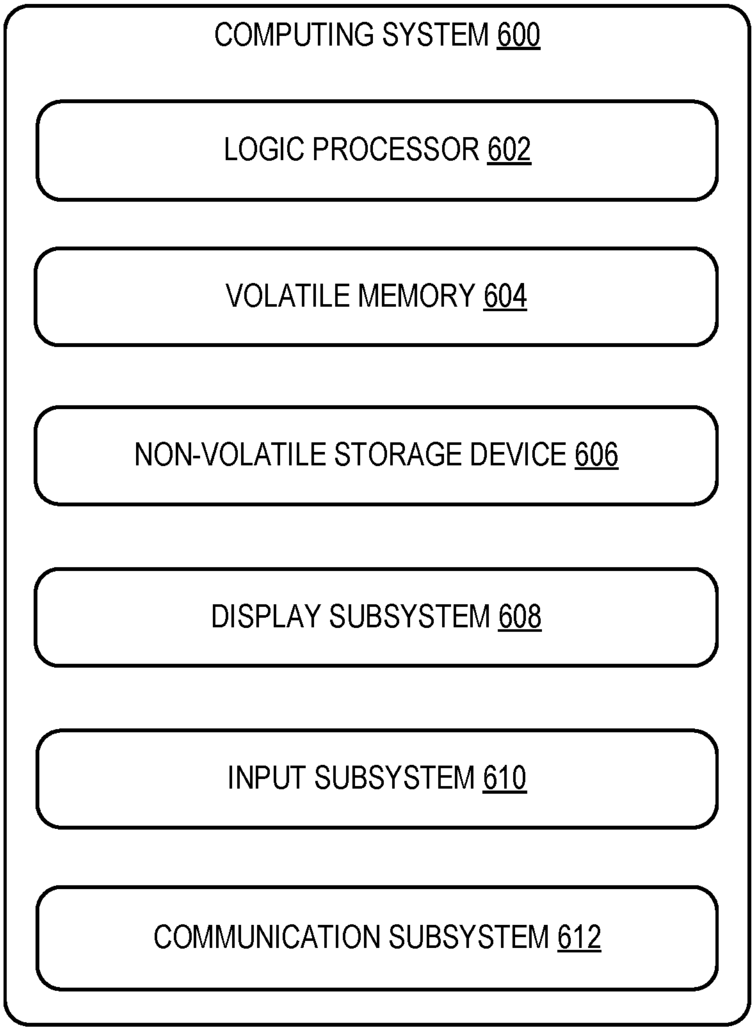
FIG. 6 shows a schematic view of an example computing system, which can be implemented in the computing system of FIG. 1.

FIG. 6 schematically shows a non-limiting embodiment of a computing system 600 that can enact one or more of the methods and processes described above. Computing system 600 is shown in simplified form. Computing system 600 may be implemented as or part of the computing system 100 described above and illustrated in FIG. 1. For example, computing system 600 may be a computing device implemented as a component of computing system 100. Components of computing system 600 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs provide additional description of the subject matter of the present disclosure. One aspect provides a computing system for implementing hybrid access control management, the computing system comprising: processing circuitry coupled to memory that stores instructions, which, upon execution by the processing circuitry, cause the processing circuitry to: receive a request from a user to access an access-controlled resource; determine a protection mechanism of the access-controlled resource, wherein the protection mechanism is an attribute-based protection mechanism or a role-based protection mechanism; validate the request from the user based on the determination of the protection mechanism; and permit the user to access the access-controlled resource upon successful validation of the request. In this aspect, additionally or alternatively, validating the request comprises: in response to determining that the protection mechanism is an attribute-based protection mechanism: retrieve attributes associated with an attribute-based access control policy describing attribute values permitted to access the access-controlled resource; and validate the retrieved attributes against the attribute-based access control policy; and in response to determining that the protection mechanism is a role-based protection mechanism: determine a role of the user; and validate the role of the user against a role-based access control policy describing one or more roles permitted to access the access-controlled resource. In this aspect, additionally or alternatively, the attribute-based access control policy and the role-based access control policy are stored in a hybrid policy store database. In this aspect, additionally or alternatively, the hybrid policy store database is managed by a hybrid policy administration point module. In this aspect, additionally or alternatively, the attribute-based access control policy and the role-based access control policy are generated by the hybrid policy administration point module. In this aspect, additionally or alternatively, the retrieved attributes comprise one or more of: an attribute associated with the user, an attribute associated with the access-controlled resource, an attribute associated with an environment, or an attribute associated with an intended operation of the request. In this aspect, additionally or alternatively, the role of the user was automatically assigned based on data of the user. In this aspect, additionally or alternatively, the data of the user and the retrieved attributes are stored in a policy information point database. In this aspect, additionally or alternatively, the request is received by a policy enforcement point module; and access to the access-controlled resource is enforced by the policy enforcement point module. In this aspect, additionally or alternatively, determining the protection mechanism of the access-controlled resource is performed by the policy enforcement point module.

Another aspect provides a method for implementing hybrid access control management for stored resources, the method comprising: receiving a request from a user to access an access-controlled resource; determining a protection mechanism of the access-controlled resource, wherein the protection mechanism is an attribute-based protection mechanism or a role-based protection mechanism; validating the request from the user based on the determination of the protection mechanism; and permitting the user to access the access-controlled resource upon successful validation of the request. In this aspect, additionally or alternatively, validating the request comprises: in response to determining that the protection mechanism is an attribute-based protection mechanism: retrieving attributes associated with an attribute-based access control policy describing attribute values permitted to access the access-controlled resource; and validating the retrieved attributes against the attribute-based access control policy; and in response to determining that the protection mechanism is a role-based protection mechanism: determining a role of the user; and validating the role of the user against a role-based access control policy describing one or more roles permitted to access the access-controlled resource. In this aspect, additionally or alternatively, the attribute-based access control policy and the role-based access control policy are stored in a hybrid policy store database. In this aspect, additionally or alternatively, the hybrid policy store database is managed by a hybrid policy administration point module. In this aspect, additionally or alternatively, the attribute-based access control policy and the role-based access control policy are generated by the hybrid policy administration point module. In this aspect, additionally or alternatively, the retrieved attributes comprise one or more of: an attribute associated with the user, an attribute associated with the access-controlled resource, an attribute associated with an environment, or an attribute associated with an intended operation of the request. In this aspect, additionally or alternatively, the role of the user was automatically assigned based on data of the user. In this aspect, additionally or alternatively, the data of the user and the retrieved attributes are stored in a policy information point database. In this aspect, additionally or alternatively, the request is received by a policy enforcement point module; and access to the access-controlled resource is enforced by the policy enforcement point module.

Another aspect provides a computing system for implementing hybrid access control management, the computing system comprising: a processing circuitry coupled to memory that stores instructions, which, upon execution by the processing circuitry, cause the processing circuitry to: receive a first request to access an attribute-based managed resource; retrieve attributes associated with an attribute-based access control policy describing attributes permitted to access the attribute-based managed resource; permit access to the attribute-based managed resource upon validation of the retrieved attributes against the attribute-based access control policy; receive a second request to access a role-based managed resource; determine role of a user providing the second request; and permit access to the role-based managed resource upon validation of the determined role against a role-based access policy describing one or more roles permitted to access the role-based managed resource.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for implementing hybrid access control management, the computing system comprising:
- processing circuitry coupled to memory that stores instructions, which, upon execution by the processing circuitry, cause the processing circuitry to:
  - receive a request from a user account to access an access-controlled resource;
  - determine a protection mechanism of the access-controlled resource, wherein the protection mechanism is an attribute-based protection mechanism or a role-based protection mechanism;
  - validate the request from the user account based on the determination of the protection mechanism, wherein validating the request comprises:
    - in response to determining that the protection mechanism is a role-based protection mechanism:
      - determining a role of the user account, wherein the role of the user account is assigned automatically based on data of the user account, and wherein the role of the user account is updated dynamically as the data of the user account is updated; and
      - validating the role of the user account against a role-based access control policy describing one or more roles permitted to access the access-controlled resource; and
    - in response to determining that the protection mechanism is an attribute-based protection mechanism:
      - retrieving attributes associated with an attribute-based access control policy describing attribute values permitted to access the access-controlled resource; and
      - validating the retrieved attributes against the attribute-based access control policy, wherein the attributes and the data of the user account for determining the role of the user account are stored in a policy information point database; and
  - permit the user account to access the access-controlled resource upon successful validation of the request.

2. The computing system of claim 1, wherein the role of the user account is updated when the data of the user account is updated to meet a predetermined criteria for a given role.

3. The computing system of claim 1, wherein the request is received by a policy enforcement point module; and access to the access-controlled resource is enforced by the policy enforcement point module.

4. The computing system of claim 3, wherein determining the protection mechanism of the access-controlled resource is performed by the policy enforcement point module.

5. The computing system of claim 1, wherein the attribute-based access control policy and the role-based access control policy are stored in a hybrid policy store database.

6. The computing system of claim 5, wherein the hybrid policy store database is managed by a hybrid policy administration point module.

7. The computing system of claim 6, wherein the attribute-based access control policy and the role-based access control policy are generated by the hybrid policy administration point module.

8. The computing system of claim 1, wherein the retrieved attributes comprise one or more of: an attribute associated with the user account, an attribute associated with the access-controlled resource, an attribute associated with an environment, or an attribute associated with an intended operation of the request.

9. A method for implementing hybrid access control management for stored resources, the method comprising:

receiving a request from a user account to access an access-controlled resource;

determining a protection mechanism of the access-controlled resource, wherein the protection mechanism is an attribute-based protection mechanism or a role-based protection mechanism;

validating the request from the user account based on the determination of the protection mechanism, wherein validating the request comprises:

in response to determining that the protection mechanism is a role-based protection mechanism:

determining a role of the user account, wherein the role of the user account is assigned automatically based on data of the user account, and wherein the role of the user account is updated dynamically as the data of the user account is updated; and validating the role of the user account against a role-based access control policy describing one or more roles permitted to access the access-controlled resource; and in response to determining that the protection mechanism is an attribute-based protection mechanism:

retrieving attributes associated with an attribute-based access control policy describing attribute values permitted to access the access-controlled resource; and validating the retrieved attributes against the attribute-based access control policy, wherein the attributes and the data of the user account for determining the role of the user account are stored in a policy information point database; and permitting the user account to access the access-controlled resource upon successful validation of the request.

10. The method of claim 9, wherein the role of the user account is updated when the data of the user account is updated to meet a predetermined criteria for a given role.

11. The method of claim 9, wherein the request is received by a policy enforcement point module; and access to the access-controlled resource is enforced by the policy enforcement point module.

12. The method of claim 9, wherein the attribute-based access control policy and the role-based access control policy are stored in a hybrid policy store database.

13. The method of claim 12, wherein the hybrid policy store database is managed by a hybrid policy administration point module.

14. The method of claim 13, wherein the attribute-based access control policy and the role-based access control policy are generated by the hybrid policy administration point module.

15. The method of claim 9, wherein the retrieved attributes comprise one or more of: an attribute associated with the user account, an attribute associated with the access-controlled resource, an attribute associated with an environment, or an attribute associated with an intended operation of the request.

16. A computing system for implementing hybrid access control management, the computing system comprising:

a processing circuitry coupled to memory that stores instructions, which, upon execution by the processing circuitry, cause the processing circuitry to:

receive a first request to access an attribute-based managed resource;

retrieve attributes associated with an attribute-based access control policy describing attributes permitted to access the attribute-based managed resource;

permit access to the attribute-based managed resource upon validation of the retrieved attributes against the attribute-based access control policy;

receive a second request to access a role-based managed resource;

determine a role of a user account providing the second request, wherein the role of the user account is assigned automatically based on data of the user account, wherein the role of the user account is updated dynamically as the data of the user account is updated, and wherein the attributes and the data of the user account for determining the role of the user account are stored in a policy information point database; and permit access to the role-based managed resource upon validation of the determined role against a role-based access policy describing one or more roles permitted to access the role-based managed resource.

* * * * *